US010369993B2

(12) United States Patent
Schroeder et al.

(10) Patent No.: US 10,369,993 B2
(45) Date of Patent: Aug. 6, 2019

(54) METHOD AND DEVICE FOR MONITORING A SETPOINT TRAJECTORY TO BE TRAVELED BY A VEHICLE FOR BEING COLLISION FREE (71) Applicant: Robert Bosch GmbH, Stuttgart (DE)

(72) Inventors: Christoph Schroeder, Sunnyvale, CA (US); Oliver Pink, Ditzingen (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 6 days.

(21) Appl. No.: 15/554,246

(22) PCT Filed: Jan. 25, 2016

(86) PCT No.: PCT/EP2016/051406
§ 371 (c)(1),
(2) Date: Aug. 29, 2017

(87) PCT Pub. No.: WO2016/150590
PCT Pub. Date: Sep. 29, 2016

(65) Prior Publication Data
US 2018/0050694 A1 Feb. 22, 2018

(30) Foreign Application Priority Data

Mar. 20, 2015 (DE) ........................ 10 2015 205 048

(51) Int. Cl.
*G08G 1/16* (2006.01)
*G01S 13/86* (2006.01)
(Continued)

(52) U.S. Cl.
CPC ......... *B60W 30/0956* (2013.01); *G01S 13/89* (2013.01); *G01S 13/931* (2013.01);
(Continued)

(58) Field of Classification Search
CPC ...... G01S 13/89; G01S 13/931; G01S 17/936; G08G 1/16; G08G 1/166
(Continued)

(56) References Cited

U.S. PATENT DOCUMENTS

2014/0200801 A1* 7/2014 Tsuruta ................. B60W 30/00
701/400

FOREIGN PATENT DOCUMENTS

DE 102009020649 A1 11/2010
DE 102013201935 A1 8/2014
(Continued)

OTHER PUBLICATIONS

International Search Report dated May 13, 2016, of the corresponding International Application PCT/EP2016/051406 filed Jan. 25, 2016.

Primary Examiner — Maceeh Anwari
(74) Attorney, Agent, or Firm — Norton Rose Fulbright US LLP; Gerard Messina (57) ABSTRACT A method for monitoring a setpoint trajectory to be traveled by a vehicle for being collision free, including carrying out a clearance measurement of vehicle surroundings with the aid of a surroundings sensor system to determine a clearance in the vehicle surroundings, carrying out an object measurement of the vehicle surroundings with the aid of the surroundings sensor system to determine objects in the vehicle surroundings, checking the setpoint trajectory for being collision free based on the determined clearance and the determined objects, and comparing particular results of the checks for being collision free to one another, an item of collision information being provided based on the comparison.

8 Claims, 5 Drawing Sheets (51) Int. Cl.
    *G01S 13/89*           (2006.01)
    *G01S 13/93*           (2006.01)
    *G01S 17/93*           (2006.01)
    *B60W 30/095*         (2012.01)

(52) U.S. Cl.
    CPC .............. *G01S 17/936* (2013.01); *G08G 1/16* (2013.01); *G08G 1/166* (2013.01); *B60W 2550/10* (2013.01); *G01S 13/865* (2013.01); *G01S 13/867* (2013.01)

(58) Field of Classification Search
    USPC ........................................................ 701/301
    See application file for complete search history.

(56) References Cited

FOREIGN PATENT DOCUMENTS

| EP | 1612580 A1 | 1/2006 |
|----|------------|--------|
| EP | 2765047 A1 | 8/2014 |
| JP | 2001060111 A | 3/2001 |
| JP | 2014164424 A | 9/2014 |

\* cited by examiner

METHOD AND DEVICE FOR MONITORING A SETPOINT TRAJECTORY TO BE TRAVELED BY A VEHICLE FOR BEING COLLISION FREE

FIELD

The present invention relates to a method and a device for monitoring a setpoint trajectory to be traveled by a vehicle for being collision free. The present invention furthermore relates to a system for monitoring a setpoint trajectory to be traveled by a vehicle for being collision free, a vehicle, and a computer program.

BACKGROUND INFORMATION

In highly-automated driving, monitoring the setpoint trajectory computed by the vehicle before it is traveled is indispensable for reasons of safety. Fundamentally, the setpoint trajectory including all detected objects is checked for collisions. If a setpoint trajectory is to result in a collision, it is classified as inadvisable and is not traveled. However, it is generally not trivial to determine the actual size (in particular width and length) of objects. In particular surroundings sensors, for example, a radar sensor or a monocamera, are at best capable of recognizing that an object is located somewhere in the field of vision. This sensor typically may not determine the precise contour of the object. Therefore, checking trajectories based on detected objects is not always expedient.

SUMMARY

An object of the present invention includes providing an improved method for monitoring a setpoint trajectory to be traveled by a vehicle for being collision free.

An object of the present invention further includes providing in each case a corresponding device, a corresponding system, a vehicle, and a computer program.

These objects may be achieved in accordance with the present invention. Advantageous embodiments of the present invention are described herein.

According to one aspect of the present invention, a method is provided for monitoring a setpoint trajectory to be traveled by a vehicle for being collision free, including the following steps:

carrying out a clearance measurement of vehicle surroundings with the aid of a surroundings sensor system to determine a clearance in the vehicle surroundings, carrying out an object measurement of the vehicle surroundings with the aid of the surroundings sensor system to determine objects in the vehicle surroundings, checking the setpoint trajectory for being collision free based on the determined clearance and the determined objects, comparing particular results of the checks for being collision free to one another, an item of collision information being provided based on the comparison.

According to a further aspect, a device is provided for monitoring a setpoint trajectory to be traveled by a vehicle for being collision free, including:

a control unit for controlling a surroundings sensor system, so that the surroundings sensor system carries out a clearance measurement of vehicle surroundings and an object measurement of the vehicle surroundings, a processor, which is designed to determine a clearance in the vehicle surroundings based on the clearance measurement and to determine objects in the vehicle surroundings based on the object measurement, the processor furthermore being designed to check the setpoint trajectory for being collision free in each case based on the determined clearance and the determined objects, the processor furthermore being designed to compare particular results of the checks for being collision free to one another and to provide an item of collision information based on the comparison.

According to another aspect, a system is provided for monitoring a setpoint trajectory to be traveled by a vehicle for being collision free, including a surroundings sensor system and the device according to the present invention.

According to yet another aspect, a vehicle is provided, including the system according to the present invention.

According to yet another aspect, a computer program is provided, which includes program code for carrying out the method according to the present invention when the computer program is executed on a computer.

The present invention thus includes checking the setpoint trajectory to be traveled by the vehicle two times for being collision free; once based on a clearance measurement and once based on an object measurement of the vehicle surroundings. This thus means that the clearance in the vehicle surroundings is determined on the one hand and objects in the vehicle surroundings are determined on the other hand. In the check of the setpoint trajectory for being collision free, it is checked in particular whether the setpoint trajectory is free from collisions in the clearance. In particular, in the check of the setpoint trajectory for being collision free, it is checked whether the setpoint trajectory collides with the determined objects.

The advantages of a collision check based on a clearance measurement and on an object measurement are therefore advantageously combined with one another. A safety requirement which is placed on a highly-automated driving function may thus be met in an advantageous manner. Improved collision monitoring is thus enabled, which advantageously reduces or even avoids a risk of collision for the vehicle.

A clearance within the meaning of the present invention refers in particular to a space or an area which is free of objects, i.e., which may be traveled with the aid of the vehicle.

Because the collision information is provided based on the comparison, a technical advantage may be yielded that further vehicle systems or vehicle components may make their decisions depending on the comparison. Therefore, these vehicle systems or vehicle components may react adequately to the result of the comparison.

An item of collision information within the meaning of the present invention includes, for example, the following information: the setpoint trajectory to be traveled is free of collisions, the setpoint trajectory to be traveled is not free of collisions, both checks have yielded or ascertained the same result, both checks have yielded different results.

According to one specific embodiment, only one comparison of the two individual checks is provided. This means that only the two individual checks are compared to one another.

In one specific embodiment it is provided that for the clearance determination, the object measurement is used as an exclusion criterion for whether an object is or is not at a location in the vehicle surroundings, so that the location is accordingly characterized as free or not free. This yields the technical advantage in particular that improved clearance determination is enabled. A double check therefore advantageously takes place for a location in the vehicle surroundings as to whether this location is free or not: once with the aid of the clearance measurement and once with the aid of the object measurement. This thus means in particular that a location in the vehicle surroundings is only characterized as free if the object measurement has the result that no object is located at this location. Conversely, the location is characterized as not free if the object measurement has the result that an object is located at this location. The clearance is then determined accordingly.

According to another specific embodiment it is provided that for the object determination, the clearance measurement is used as an exclusion criterion for whether a location in the vehicle surroundings is free or not, so that an object is associated with the location or not accordingly. This yields the technical advantage in particular that improved and more robust object determination is enabled because a double check of a location in the vehicle surroundings also takes place here, regarding whether an object is located at this location or not. This thus means in particular that an object is only associated with the location in the scope of the object determination if the clearance measurement has not had the result that the space is free at this location. Conversely, no object is associated with this location within the scope of the object determination if the clearance measurement has the result that this location in the vehicle surroundings is free.

According to another specific embodiment, it is provided that the surroundings sensor system includes one or multiple surroundings sensors. Surroundings sensors are the following sensors, for example: radar sensor, video sensor, in particular video sensor or video sensors of a stereo camera, LIDAR sensor, or laser sensor. The above-mentioned surroundings sensors sensorially detect vehicle surroundings and provide sensor data corresponding to the sensorially detected vehicle surroundings, also referred to as surroundings sensor data.

According to one specific embodiment it is provided that the surroundings sensor system includes multiple surroundings sensors which measure a clearance as clearance sensors for carrying out the clearance measurement and/or measure objects as object sensors for carrying out the object measurement and provide clearance sensor data and/or object sensor data corresponding to the particular measurement, the clearance sensor data being fused and/or the object sensor data being fused, so that the determined clearance is based on the fused clearance sensor data and/or the determined objects are based on the fused object sensor data.

This may yield the technical advantage in particular that a more accurate and improved object measurement and an improved and more robust clearance measurement may be carried out. In particular, a more accurate and improved surroundings model of surroundings of the vehicle may be ascertained based on the fused clearance sensor data and the fused object sensor data, based on which a collision check of the setpoint trajectory is carried out.

In another specific embodiment it is provided that carrying out the object measurement includes determining object positions and/or object contours. This means in particular that within the scope of the object measurement, an object position and/or an object contour of the objects is/are determined. It may thus advantageously be checked in an even more accurate and improved manner whether the setpoint trajectory to be traveled collides with the determined objects or not.

According to another specific embodiment it is provided that a result of the clearance measurement is represented in a grid-based or particle-based manner, so that the determined clearance is a grid-based clearance or a particle-based clearance. This thus means in particular that the clearance may be represented as a grid. This means in particular that the clearance may be represented or described as particles. A similar performance is achievable using both specific embodiments (grid-based and particle-based). There are differences, inter alia, in the required computing time, which is generally not essential, however.

According to one specific embodiment, the surroundings sensor system is included by the vehicle.

Functionalities of the device and the system similarly result from the corresponding functionalities of the method. This thus means in particular that device and system features result similarly from the method features and vice versa.

According to one specific embodiment, it is provided that the device for monitoring a setpoint trajectory to be traveled by a vehicle for being collision free is configured to execute or carry out the method for monitoring a setpoint trajectory to be traveled by a vehicle for being collision free.

The present invention is explained in greater detail below on the basis of preferred exemplary embodiments.

DETAILED DESCRIPTION OF EXAMPLE EMBODIMENTS

Figure 1:
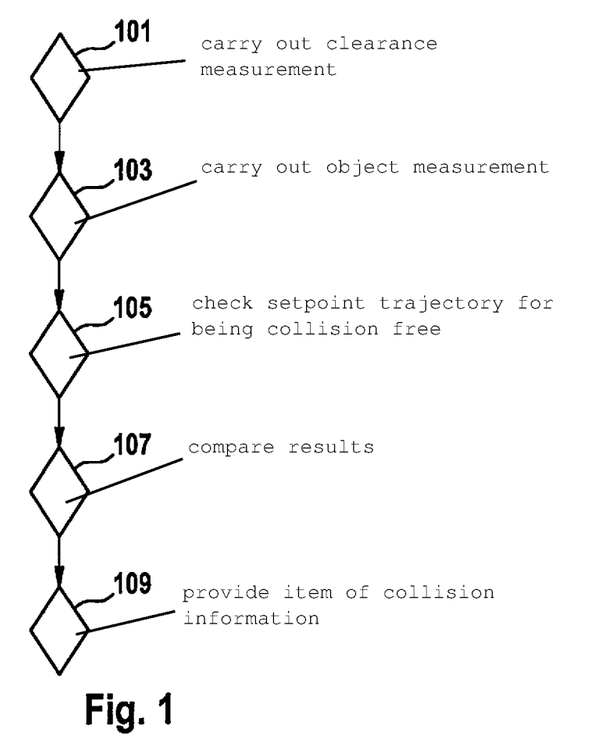
FIG. 1 shows a flow chart of a method for monitoring a setpoint trajectory to be traveled by a vehicle for being collision free.

FIG. 1 shows a flow chart of a method for monitoring a setpoint trajectory to be traveled by a vehicle for being collision free.

According to a step 101, a clearance measurement of vehicle surroundings is carried out with the aid of a surroundings sensor system to determine a clearance in the vehicle surroundings. According to a step 103, an object measurement of the vehicle surroundings is carried out with the aid of the surroundings sensor system to determine objects in the vehicle surroundings. In a step 105, the setpoint trajectory is checked for being collision free in each case based on the determined clearance and the determined objects.

In a step 107, particular results of the checks for being collision free according to step 105 are compared to one another, an item of collision information being provided based on the comparison according to a step 109.

The collision information is provided, for example, to an ascertainment unit for ascertaining the setpoint trajectory to be traveled. Such an ascertainment unit thus knows that its ascertained setpoint trajectory is possibly collision-afflicted, i.e., is not collision free. It is preferably provided that the ascertainment unit again computes or ascertains the setpoint trajectory to be traveled.

Figure 2:
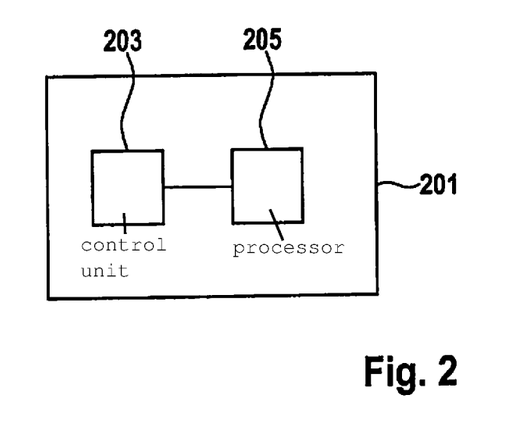
FIG. 2 shows a device for monitoring a setpoint trajectory to be traveled by a vehicle for being collision free.

FIG. 2 shows a device 201 for monitoring a setpoint trajectory to be traveled by a vehicle for being collision free.

Device 201 includes a control unit 203 for controlling a surroundings sensor system, so that the surroundings sensor system carries out a clearance measurement of vehicle surroundings and an object measurement of the vehicle surroundings. Device 201 furthermore includes a processor 205, which is designed to determine a clearance in the vehicle surroundings based on the clearance measurement and to determine objects in the vehicle surroundings based on the object measurement. Processor 205 is furthermore designed to check the setpoint trajectory for being collision free based on the determined clearance and the determined objects. Processor 205 is furthermore designed to compare particular results of the checks for being collision free to one another and to provide an item of collision information based on the comparison.

Figure 3:
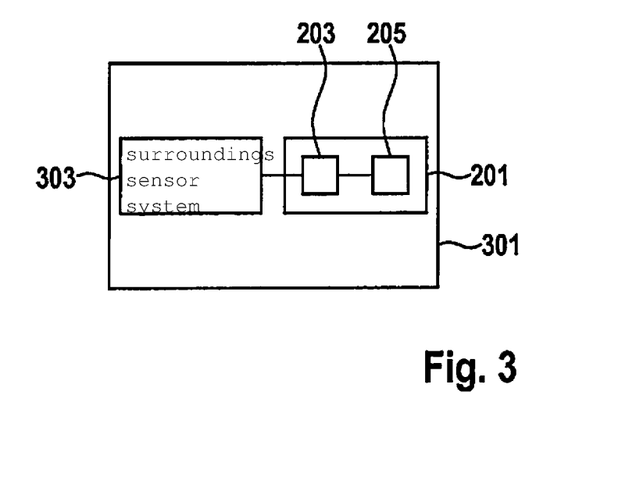
FIG. 3 shows a system for monitoring a setpoint trajectory to be traveled by a vehicle for being collision free.

FIG. 3 shows a system 301 for monitoring a setpoint trajectory to be traveled by a vehicle for being collision free.

System 301 includes a surroundings sensor system 303 and device 201 of FIG. 2.

Figure 4:
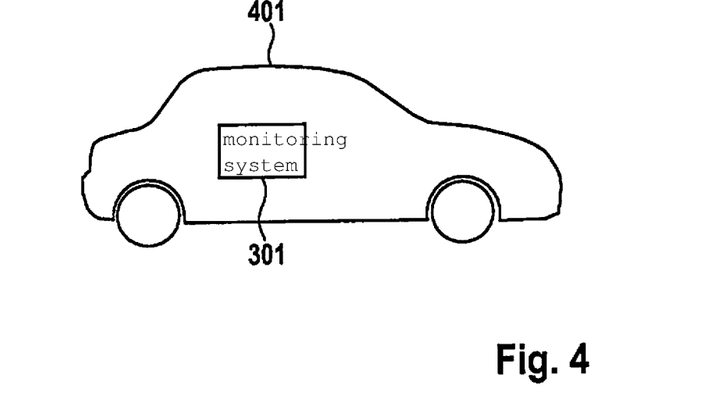
FIG. 4 shows a vehicle.

FIG. 4 shows a vehicle 401, which includes system 301 according to FIG. 3. For the sake of clarity, not all features of system 301 are plotted in FIG. 4.

Figure 5:
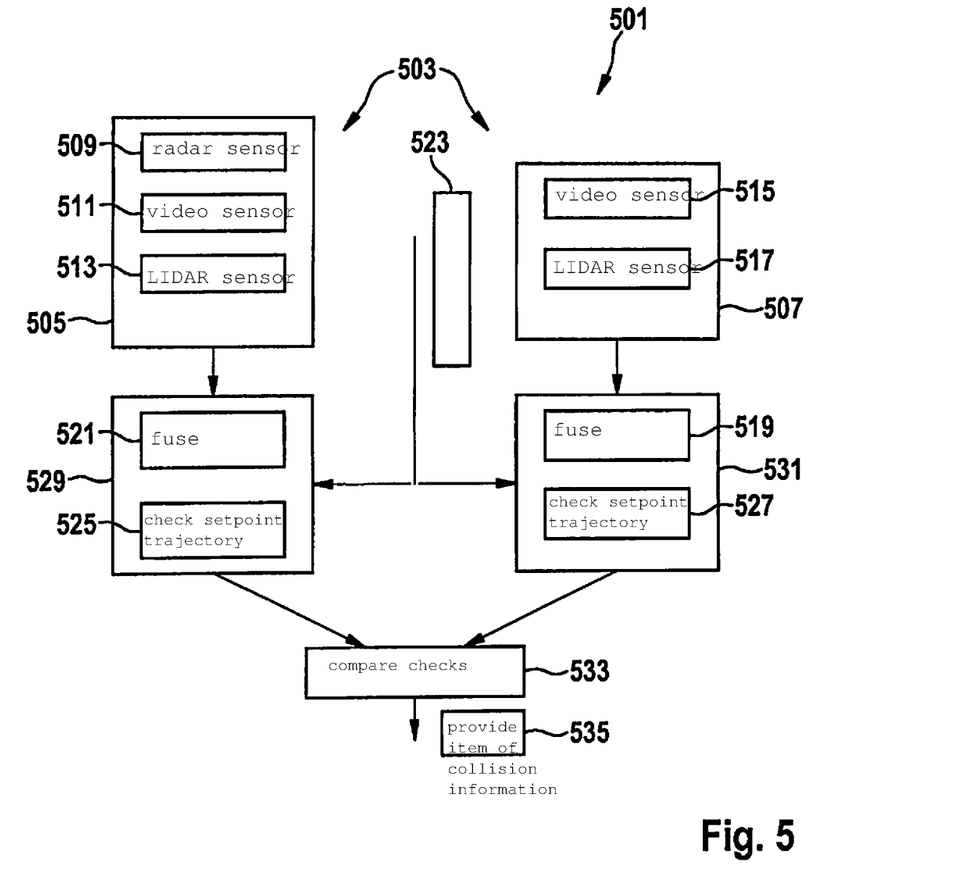
FIG. 5 shows a block diagram of a further system for monitoring a setpoint trajectory to be traveled by a vehicle for being collision free.

FIG. 5 shows a block diagram of a further system 501 for monitoring a setpoint trajectory to be traveled by a vehicle for being collision free.

System 501 includes a surroundings sensor system 503, which has, on the one hand, a group of object sensors 505 and, on the other hand, a group of clearance sensors 507. The group of object sensors 505 includes, for example, a radar sensor 509, a video sensor 511, and a LIDAR sensor 513. The group of clearance sensors 507 includes, for example, a video sensor 515 and a LIDAR sensor 517.

The individual surroundings sensors, i.e., object sensors 505 and clearance sensors 507, sensorially detect vehicle surroundings and provide corresponding particular surroundings sensor data. In this case, the individual surroundings sensors are controlled with the aid of a control unit (not shown).

The clearance sensor data, i.e., the surroundings sensor data of video sensor 515 and LIDAR sensor 517, are fused according to a step 519. Similarly, the surroundings sensor data, i.e., the object sensor data, of object sensors 505, i.e., radar sensor 509, video sensor 511, and LIDAR sensor 513, are fused with one another; this, according to a step 521. A clearance in the vehicle surroundings is determined or objects in the vehicle surroundings are determined, respectively, based on the fused sensor data. Based on the determined clearance, a setpoint trajectory 523 to be traveled by the vehicle is checked for being collision free; this, according to a step 525. Similarly, setpoint trajectory 523 is checked for being collision free based on the determined objects in the vehicle surroundings according to a step 527.

Fusion 521 and collision check 525 are part of a processing block 529. Fusion 519 and collision check 527 are part of a processing block 531. The two processing blocks 529 and 531 each represent, for example, a processor or a processing unit, which carries out the above-mentioned steps, the steps being able to be carried out, for example, on a shared processor or a shared processing unit.

Particular results of the two collision checks are compared to one another according to a step 533, to provide an item of collision information 535 based on the comparison. The fusion, the checking for being collision free, the comparison, and the provision of the collision information are carried out with the aid of a processor (not shown here).

Figure 6:
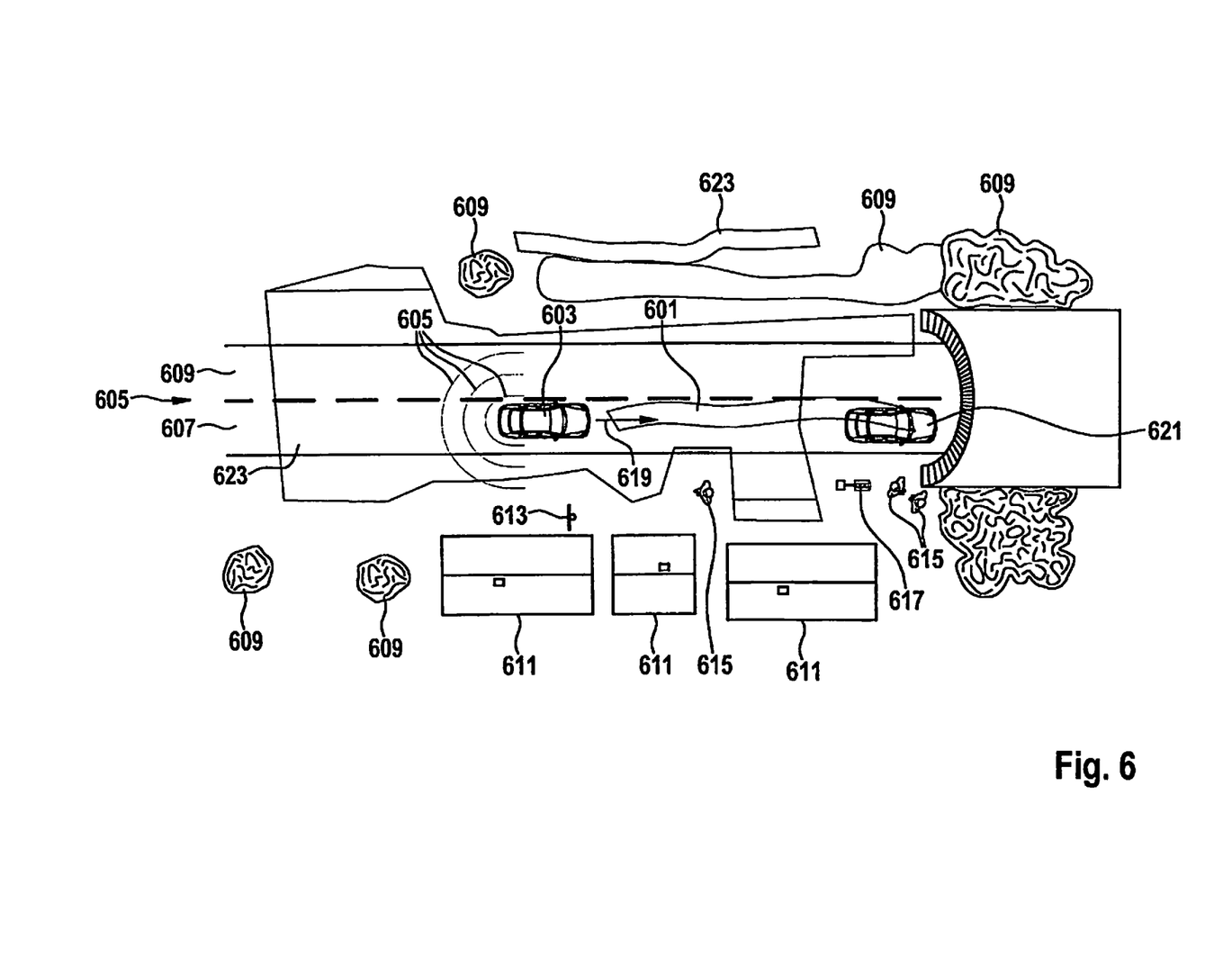
FIG. 6 shows an exemplary collision check of a collision-afflicted setpoint trajectory.

FIG. 6 shows a check of a collision-afflicted setpoint trajectory 601 by way of example.

A vehicle 603 is shown, which may sensorially detect its surroundings with the aid of a surroundings sensor system (not shown here). To symbolically represent the sensorial detection of the vehicle surroundings, semicircular graphic elements having reference numeral 605 are plotted.

Vehicle 603 travels on a road 605 including two lanes 607 and 609. Vehicle 603 travels on lane 607.

Multiple objects are situated in the surroundings of vehicle 603. For example, shrubs or plants are situated in the surroundings of vehicle 603. These are provided with reference numeral 609. For example, buildings 611 are situated in the surroundings of vehicle 603. A traffic sign 613 is situated in the surroundings of vehicle 603, for example.

Furthermore, persons 615 and a light signal system 617 are located in the vehicle surroundings. A travel direction of the vehicle is symbolically identified with the aid of an arrow having reference numeral 619.

A further vehicle 621 is located ahead in travel direction 619. Setpoint trajectory 601 is collision-afflicted insofar as traveling down it would result in a collision of vehicle 603 with further vehicle 621.

The sensorial detection of the vehicle surroundings includes in particular a clearance measurement and an object measurement.

Setpoint trajectory 601 is checked for being collision free based on the object measurement and the clearance measurement. In this case, FIG. 6 shows this check based on the clearance measurement.

Such a check is dependent in particular on a representation of the surroundings sensor data, which were provided with the aid of the clearance sensors. If the representation of the clearance data is grid-based according to one specific embodiment, according to one specific embodiment, an exemplary test or an exemplary check of setpoint trajectory 601 for being collision free is thus carried out as follows:

In the first step, for example, configuration space 623 is computed (it may be computed, for example, by essentially folding the free area with a model (with respect to the size and orientation) of the vehicle. This is preferably carried out for all possible orientations of the vehicle and results in a multidimensional configuration space 623. Configuration space 623 is the n-dimensional hyperspace, which is formed by the independent degrees of freedom of a system. Any actual movement represents a trajectory in configuration space 623. In contrast to the phase space, configuration space 623 does not depict the momentum of the individual elements, because of which only the present configuration or the present state of the system, respectively, is shown, while the further movement of the individual elements may not be derived. Configuration space 623 is thus the clearance or describes a free area which may be traveled by vehicle 603.

A grid including multiple cells, having suitable scaling and dimensioning, results, in which the freedom or ability to travel a cell is characterized in that the cell is located completely in free configuration space 623. The grid is thus in particular a projected representation of the configuration space. Suitable in this context means in particular suitable as a function of the range and/or application. For example, for a non-expressway driver, a grid size or cell size of 20 cm to 30 cm is sufficient; for an urban driver, however, this size has to be more in the range of 10 cm. In this case, that suitable means that the cell size or grid size is adapted, in particular optimally adapted, to the specific existing traffic situation. The grid size or cell size is selected, for example, as a function of a route type (highway, expressway, city street).

The grid is therefore a space which describes all collision-free trajectories of vehicle 603 as long as they are located within the grid. This means as long as a trajectory is located within the grid or within configuration space 623, it is collision free.

Trajectory 603 is checked in this space, by checking for all cells which are traversed by the trajectory whether they are free or may be traveled. The checking of trajectory 603 in this space therefore has to be carried out, since a cell may be free or able to be traveled (extracted on the configuration space); therefore the trajectory has to be checked in this context.

A trajectory from a start to a destination refers according to one specific embodiment to a sequence of adjacent points in configuration space 623. This definition of the trajectory relates here to the collision check with dynamic objects, i.e., objects which move or at least may move, this collision check in particular following after the trajectory generation or trajectory ascertainment with the aid of the configuration space.

For the object-based collision check, for example, a circle-based approach is used. Host vehicle 603 and all further vehicles located in the scene (for example, further vehicle 621) are approximated by circles here and an overlap of the circles is then computed for all trajectory times. If there is a point in time at which the approximation of the host vehicle (vehicle 603) overlaps with the approximation of another road user (for example, further vehicle 621), a collision may be presumed.

In the last step, a comparison of the results of the two collision checks is carried out. If one of the two checks has a negative result within the meaning of a recognized collision, this is indicated to the system generating the trajectories (for example, the ascertainment unit), and an item of collision information is provided.

The present invention may be used with highly-automated and autonomous driving, where it may advantageously be used in the monitoring of the system. Furthermore, there are numerous further fields of activity, in which similar tasks, requirements, and approaches are necessary. This is the case in particular in automation technology and robotics. This means that the present invention, as was described in conjunction with vehicles, may be or is used or employed in automation technology and/or robotics according to other specific embodiments.

Figure 7:
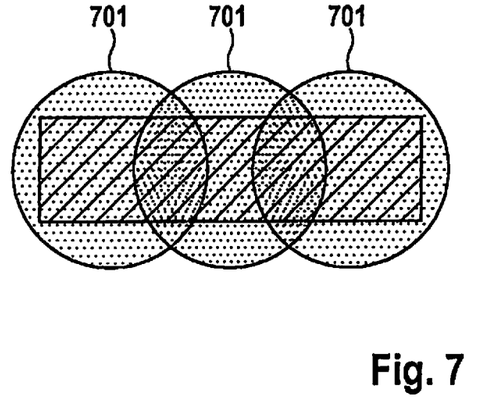
FIG. 7 shows an object-based collision check.

FIG. 7 shows an object-based collision check or an object-based collision test. In this case, as already explained above, vehicle 603 is approximated by a circle 701, an overlap time of circles 701 being computed for all trajectory times. All further vehicles, for example, vehicle 621, are also approximated by such circles. In particular, all objects, for example, shrubs, buildings, and persons, are approximated by circles. This advantageously causes the collision check to be able to be implemented with efficient computation by algorithms.

The present invention provides an efficient solution, with the aid of which the setpoint trajectory to be traveled by the vehicle, which may be computed in particular by the vehicle itself, may be checked or monitored for being collision free. An advantage of the present invention is, for example, model-independent and reliable monitoring of setpoint trajectories, by checking the setpoint trajectory, which may be requested in particular by the vehicle, in two independent checking steps, which may be carried out in particular in two independent processing units or systems or processors, on the one hand using clearance measurements and on the other hand using object measurements, for being collision free.

It is to be noted here that it is usually not of interest what precisely is located in the space which is not free (may not be traveled). It is in particular only important for the collision check of the setpoint trajectory that it was planned in a space which is free (may be traveled).

The present invention is based on a combination of two checking methods: once based on an object measurement and once based on a clearance measurement. Even if either of these methods per se does not supply the required reliability in special application scenarios, both methods in combination are certainly advantageously capable of fulfilling the safety requirements of highly-automated driving functions.

In accordance with the present invention, a clearance-based collision check with the aid of corresponding clearance sensors is provided and on an object-based collision check with the aid of corresponding object sensors is provided.

Clearance measurements are carried out, for example, by a single sensor, such as a LIDAR or a high-resolution radar or by a combination of multiple surroundings sensors, for example, a radar sensor and a stereo video camera. Preferably, at least one sensor is thus provided which may actively measure the clearance. In one specific embodiment, object measurements provided by other sensors may be incorporated as an exclusion criterion into the clearance determination. The clearance measurement may be represented, for example, as grid-based or particle-based. It is not of particular interest in this case in particular that the clearance which actually exists is accurately and completely measured. It only has to be ensured that there is also actually a clearance at the points at which the sensor measures the clearance. It is only important from the aspect of the trajectory check that the clearance measurement does not supply false positives. The rate of the false negatives is unimportant and does not influence the safety, but rather the availability of the monitored overall system.

Object measurements may be supplied, for example, by a radar, a LIDAR, a video camera, or an arbitrary combination of these sensors. Preferably, at least one sensor is provided, which may measure objects. In one specific embodiment, clearance measurements provided by other sensors may be incorporated as an exclusion criterion into the object measurement. In the object-based check, it is decisive in particular that preferably all objects are detected and measured in terms of position and contour.

The setpoint trajectory to be traveled by the vehicle, i.e., in particular the setpoint trajectory requested by the vehicle, is now checked for being collision free based on both measurements.

What is claimed is:

1. A method comprising:
  obtaining sensor signals of a surroundings sensor system of a vehicle;
  based on the obtained sensor signals:
    performing, by a processor, a clearance measurement, wherein the clearance measurement includes identifying, in surroundings of the vehicle, an outline of an area, all locations within which are free of objects; and
    performing, by the processor, an object measurement, wherein the object measurement includes identifying, in the surroundings of the vehicle a set of discrete locations occupied by detected objects;

checking, by the processor, a previously determined setpoint trajectory of travel by the vehicle against the outline of the clearance measurement to determine, in a first determination, whether the setpoint trajectory is collision free;

checking, by the processor, the previously determined setpoint trajectory against the set of discrete locations occupied by the detected objects to determine, in a second determination, whether the setpoint trajectory is collision free;

comparing, by the processor, a result of the first determination to a result of the second determination; and based on the comparison, the processor outputting a modified version of the setpoint trajectory or controlling a driving of the vehicle;

wherein:
the surroundings sensor system includes multiple surroundings sensors that one or both of the following:
(i) measure a clearance as clearance sensors and provide clearance sensor data for carrying out the clearance measurement; and
(ii) measure objects as object sensors and provide object sensor data for carrying out the object measurement; and
one or both of the following:
(i) the clearance sensor data is fused so that the identified outline is based on the fused clearance sensor data; and
(ii) the object sensor data is fused so that the identified set of discrete locations occupied by the detected objects is based on the fused object sensor data.

2. The method as recited in claim 1, wherein, for the clearance determination measurement, the set of discrete locations occupied by objects identified in the object measurement is used as an exclusion criterion for whether an object is or is not at a location in the vehicle surroundings, so that the location is accordingly characterized as free or not free for determining the outline.

3. The method as recited in claim 1, wherein, for the object measurement, the outline of the clearance measurement is used as an exclusion criterion for whether a location in the vehicle surroundings is free or not, so that the location is accordingly associated with an object or not for determining the set of discrete locations.

4. The method as recited in claim 1, wherein the object measurement includes determining at least one of object positions and object contours.

5. The method as recited in claim 1, wherein a result of the clearance measurement is represented in grid-based or particle-based form, so that the outline outlines a grid-based clearance or a particle-based clearance.

6. A device of a vehicle, the device comprising:
a sensor system; and
a processor communicatively coupled to the sensor system;
wherein the processor is configured to:
obtain sensor signals from the sensor system;
based on the obtained sensor signals:
perform a clearance measurement, wherein the clearance measurement includes identifying, in surroundings of the vehicle, an outline of an area, all locations within which are free of objects; and
perform an object measurement, wherein the object measurement includes identifying, in the surroundings of the vehicle a set of discrete locations occupied by detected objects;

check a previously determined setpoint trajectory of travel by the vehicle against the outline of the clearance measurement to determine, in a first determination, whether the setpoint trajectory is collision free;

check the previously determined setpoint trajectory against the set of discrete locations occupied by the detected objects to determine, in a second determination, whether the setpoint trajectory is collision free;

compare a result of the first determination to a result of the second determination; and based on the comparison, output a modified version of the setpoint trajectory or control a driving of the vehicle;

wherein:
the sensor system includes multiple surroundings sensors that one or both of the following:
(i) measure a clearance as clearance sensors and provide clearance sensor data for carrying out the clearance measurement; and
(ii) measure objects as object sensors and provide object sensor data for carrying out the object measurement; and
one or both of the following:
(i) the clearance sensor data is fused so that the identified outline is based on the fused clearance sensor data; and
(ii) the object sensor data is fused so that the identified set of discrete locations occupied by the detected objects is based on the fused object sensor data.

7. A vehicle that includes a system, the system comprising:
a surroundings sensor system; and
a processor communicatively coupled to the surroundings sensor system;
wherein the processor is configured to:
obtain sensor signals from the surroundings sensor system;
based on the obtained sensor signals:
perform a clearance measurement, wherein the clearance measurement includes identifying, in surroundings of the vehicle, an outline of an area, all locations within which are free of objects; and
perform an object measurement, wherein the object measurement includes identifying, in the surroundings of the vehicle a set of discrete locations occupied by detected objects;

check a previously determined setpoint trajectory of travel by the vehicle against the outline of the clearance measurement to determine, in a first determination, whether the setpoint trajectory is collision free;

check the previously determined setpoint trajectory against the set of discrete locations occupied by the detected objects to determine, in a second determination, whether the setpoint trajectory is collision free;

compare a result of the first determination to a result of the second determination; and based on the comparison, output a modified version of the setpoint trajectory or control a driving of the vehicle;

wherein:
the surroundings sensor system includes multiple surroundings sensors that one or both of the following:
(i) measure a clearance as clearance sensors and provide clearance sensor data for carrying out the clearance measurement; and (ii) measure objects as object sensors and provide object sensor data for carrying out the object measurement; and one or both of the following:
(i) the clearance sensor data is fused so that the identified outline is based on the fused clearance sensor data; and
(ii) the object sensor data is fused so that the identified set of discrete locations occupied by the detected objects is based on the fused object sensor data.

8. A non-transitory computer readable medium on which are stored instructions that are executable by a processor of a vehicle and that, when executed by the processor, cause the processor to perform a method, the method comprising:

obtaining sensor signals of a surroundings sensor system of a vehicle;

based on the obtained sensor signals:
performing a clearance measurement, wherein the clearance measurement includes identifying, in surroundings of the vehicle, an outline of an area, all locations within which are free of objects; and
performing an object measurement, wherein the object measurement includes identifying, in the surroundings of the vehicle a set of discrete locations occupied by detected objects;

checking a previously determined setpoint trajectory of travel by the vehicle against the outline of the clearance measurement to determine, in a first determination, whether the setpoint trajectory is collision free;

checking the previously determined setpoint trajectory against the set of discrete locations occupied by the detected objects to determine, in a second determination, whether the setpoint trajectory is collision free;

comparing a result of the first determination to a result of the second determination; and based on the comparison, outputting a modified version of the setpoint trajectory or controlling a driving of the vehicle;

wherein:
the surroundings sensor system includes multiple surroundings sensors that one or both of the following:
(i) measure a clearance as clearance sensors and provide clearance sensor data for carrying out the clearance measurement; and
(ii) measure objects as object sensors and provide object sensor data for carrying out the object measurement; and one or both of the following:
(i) the clearance sensor data is fused so that the identified outline is based on the fused clearance sensor data; and
(ii) the object sensor data is fused so that the identified set of discrete locations occupied by the detected objects is based on the fused object sensor data.

* * * * *